(No Model.)

J. S. TIBBALS.
BACKWATER GATE FOR SEWERS.

No. 285,180. Patented Sept. 18, 1883.

Witnesses,
Geo. H. Strong
J. H. Rouse

Inventor
John S. Tibbals
By Dewey & Co.
Attorneys

UNITED STATES PATENT OFFICE.

JOHN S. TIBBALS, OF SAN FRANCISCO, CALIFORNIA.

BACKWATER-GATE FOR SEWERS.

SPECIFICATION forming part of Letters Patent No. 285,180, dated September 18, 1883.

Application filed February 10, 1883. (No model.)

*To all whom it may concern:*

Be it known that I, JOHN S. TIBBALS, of the city and county of San Francisco, State of California, have invented an Improved Backwater-Gate for Sewers; and I do hereby declare the following to be a full, clear, and exact description thereof.

My invention relates to a new and useful gate to prevent tide-water, &c., from backing up into sewers, or to resist any hydraulic pressure which may be applied in flushing; and it consists of a swinging valve within a pipe or casting let into the sewer and adapted to close the passage, and in a means for operating said valve, consisting of a float and mechanism connecting it with the valve, said float being within a water-box connected with the lower end of the pipe, whereby the rise of the water will operate to close the valve, as will hereinafter fully appear.

The object of my invention is to provide a simple and effective means to prevent the water from backing up into the sewer when the tide rises or when the flushing is in progress.

Figure 1:
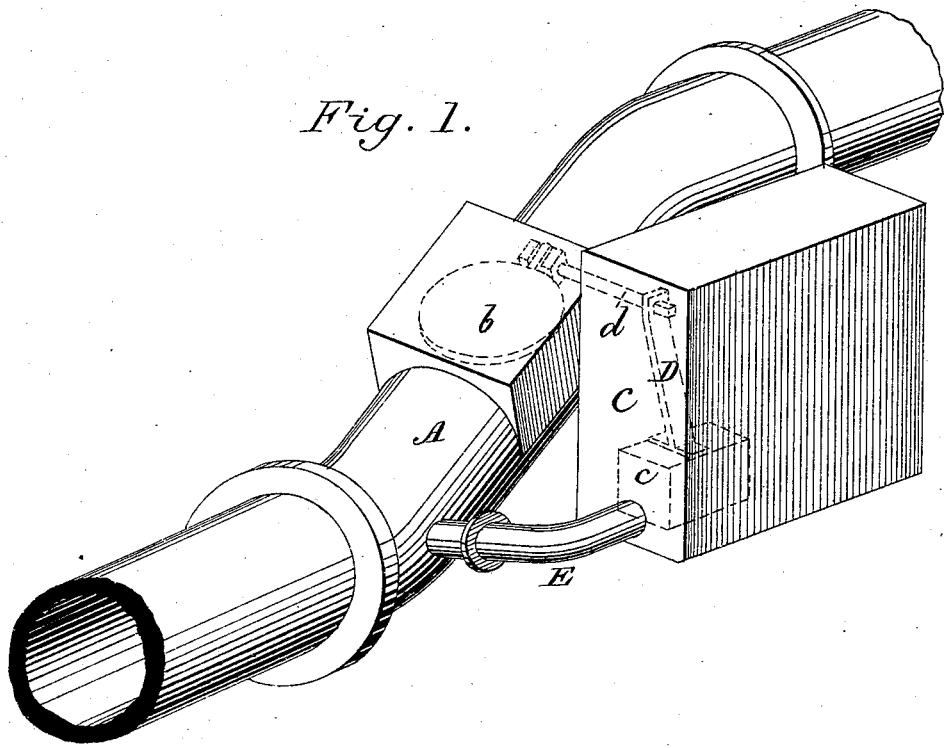
Figure 2:
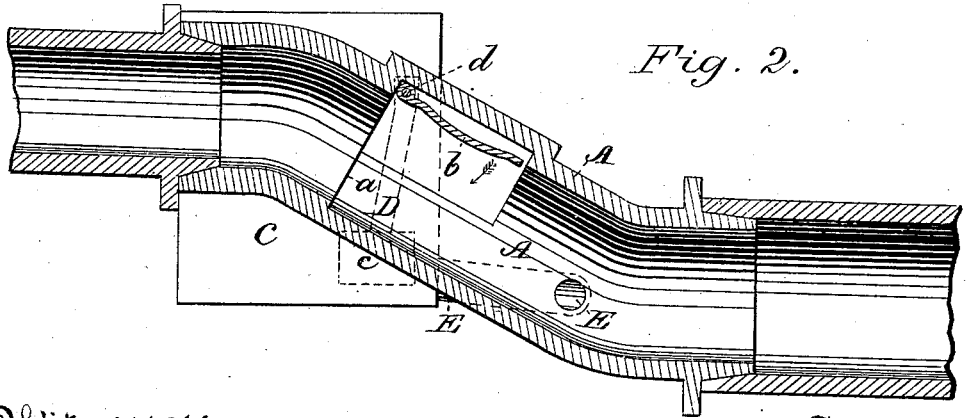

Referring to the accompanying drawings, Figure 1 is a perspective view of my device, showing the valve and float dotted in. Fig. 2 is a longitudinal vertical section of same.

Let A represent a casting or pipe bent downward, as shown, and having a shoulder, $a$, formed inside. This shoulder may be formed in any suitable manner, either cast therein or otherwise secured; or, if preferable, it may be made by forming the pipe A in two parts, one of which slips into the other, its end forming the shoulder. The upper part of pipe A, near the center, is made square and not curved, which is for the purpose of allowing the valve to swing up higher than it could if the pipe were round. In the pipe A is hinged from above a valve, $b$, which is adapted to find a seat against the shoulder $a$, and thus to completely close the passage.

The pipe or casting A may be coupled in the sewer at any desirable point or place and in any suitable manner. The operation of this valve is rendered automatic by the following means: At one side of the casting or pipe is a box, C, in which is a float, $c$. This box may be cast with the pipe, or made separate and secured to it by bolts. D is an arm or lever connecting this float with the projecting end of a shaft, $d$, upon which the valve $b$ is secured and by which it is hinged. The shaft $d$ projects through pipe A into the box C. An elbow, E, opens out of the lower end of pipe A and into box C. When the water begins to back up in the sewer, it passes into the box C, and as it rises it carries up the float $c$. This, through the lever D and shaft $d$, causes the valve to turn against its seat and effectually prevent the further rise of water in the sewer. As the water falls or recedes, the valve swings open again. The pipe A being downwardly inclined, there will be less liability of clogging or impeding the operation of the valve.

Having thus described my invention, what I claim as new, and desire to secure by Letters Patent, is—

1. In combination with the outlet of a sewer or pipe, having within a valve or gate adapted to close the passage, a water-box connected with the lower end of the sewer or pipe, and having within it a means connected with said valve and affected by the rising or backing water to operate said valve, substantially as and for the purpose herein described.

2. The pipe or casting A, let into a sewer, and the swinging valve $b$ therein, adapted to find a seat against a shoulder, $a$, in said casting and close the passage, in combination with the water-box C, the elbow E, connecting it with the lower end of the casting A, the float $c$ in the water-box, and the arm D and oscillating shaft $d$, connecting said float with the swinging valve, substantially as herein described.

In witness whereof I hereunto set my hand.

JOHN S. TIBBALS.

Witnesses:
S. H. NOURSE,
WM. F. BOOTH.